US008655032B2

(12) United States Patent
Vitt et al.

(10) Patent No.: US 8,655,032 B2
(45) Date of Patent: *Feb. 18, 2014

(54) MOBILE IDENTIFICATION SYSTEM AND METHOD

(75) Inventors: Joan L. Vitt, Parsons, KS (US); Tony L. McCowan, Pittsburg, KS (US); Derald E. Caudle, Pittsburg, KS (US)

(73) Assignee: AFIX Technologies, Inc., Pittsburg, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,578

(22) Filed: Jun. 25, 2012

(65) Prior Publication Data
US 2012/0328171 A1 Dec. 27, 2012

Related U.S. Application Data

(60) Provisional application No. 61/500,897, filed on Jun. 24, 2011.

(51) Int. Cl.
G06K 9/00 (2006.01)

(52) U.S. Cl.
USPC ............................ 382/125; 382/124; 382/115

(58) Field of Classification Search
None
See application file for complete search history.

(56) References Cited

U.S. PATENT DOCUMENTS

| | | | |
|---|---|---|---|
| 3,558,864 A | 1/1971 | French | |
| 3,699,519 A | 10/1972 | Campbell | |
| 3,893,080 A | 7/1975 | Ho et al. | |
| 4,015,240 A | 3/1977 | Swonger et al. | |
| 4,156,230 A | 5/1979 | Riganati et al. | |
| 4,210,899 A | 7/1980 | Swonger et al. | |
| 4,310,827 A | 1/1982 | Asai | |
| 4,696,046 A | 9/1987 | Schiller | |
| 4,747,147 A | 5/1988 | Sparrow | |
| 4,790,564 A | 12/1988 | Larcher et al. | |
| 4,817,183 A | 3/1989 | Sparrow | |
| 4,896,363 A | 1/1990 | Taylor et al. | |
| 4,944,021 A | 7/1990 | Hoshino et al. | |
| 4,947,442 A | 8/1990 | Tanaka et al. | |

(Continued)

OTHER PUBLICATIONS

NPL, Department of Justice Federal Bureau of Investigation, Electronic Fingerprint Transmission Specification (EFTS), Published May 2005. p. 1-216.*

NPL, Mitretek, George Kiebuzinski, How AFIS Selection Was Performed for IAFIS, published Apr. 6, 2006, p. 1-20.*

NPL—aware.com, NITSPack SDK brochure, p. 1-1 (Available since Aug. 2007).*

"AFIX VP", http://www.afix.net/newsite2006/afix-vp.html, Nov. 2006.

(Continued)

Primary Examiner — David Zarka
Assistant Examiner — Ha Le
(74) Attorney, Agent, or Firm — Law Office of Mark Brown, LLC; Mark E. Brown; Christopher M. DeBacker

(57) ABSTRACT

A mobile application stored within the mobile device allows for file collection, transfer, and display on a smart device with G3, G4, EDGE, or similar data communication capabilities. The software is used in conjunction with information collection devices synced to a smart device via blue tooth technology, such as a fingerprinting device. The device will transfer a file to the smart device running the mobile application. The application will then encrypt the file and encode the file that is then packaged into a proprietary format. The file is then sent to a web location using the data transmission capability of the mobile device. The device will then monitor a file location of a web address for a return response. It will then get the file from the web location in a standard NIST approved format, extract information and images from the file, displaying them in a GUI.

10 Claims, 3 Drawing Sheets

(56) References Cited

U.S. PATENT DOCUMENTS

| | | | |
|---|---|---|---|
| 4,947,443 A | 8/1990 | Costello | |
| 5,040,223 A | 8/1991 | Kamiya et al. | |
| 5,040,224 A | 8/1991 | Hara | |
| 5,067,162 A | 11/1991 | Driscoll, Jr. et al. | |
| 5,105,467 A | 4/1992 | Kim et al. | |
| 5,109,428 A | 4/1992 | Igaki et al. | |
| 5,187,747 A | 2/1993 | Capello et al. | |
| 5,239,590 A | 8/1993 | Yamamoto | |
| 5,420,937 A | 5/1995 | Davis | |
| 7,613,929 B2 * | 11/2009 | Cohen et al. | 713/186 |
| 8,036,431 B1 * | 10/2011 | Fisher et al. | 382/115 |
| 2004/0167929 A1 | 8/2004 | Osborne et al. | |

OTHER PUBLICATIONS

"AFIX Products Overview", http://www.afixtechnologies.com/newsite2006/afix-products.html, Nov. 2006.

Jiang, et al., "Fingerprint Minutiae Matching Based on the Local and Global Structures", (2000, pp. 1038-1041).

Adobe, "Adobe Photoshop CS2 Brochure", (2005, pp. 1-5).

Microsoft_Office_Visio_Professional_2007 (Getting started screen).

Reddy, Saveen, "Visio/IronPython/Powershell—How to draw nice diagrams from the command line", (2009, pp. 1-11).

"Microsoft Office Visio Professional 2007 Getting Started Screen".

* cited by examiner

MOBILE IDENTIFICATION SYSTEM AND METHOD

This application claims priority in U.S. Provisional Patent Application Ser. No. 61/500,897, filed Jun. 24, 2011, which is incorporated herein by reference.

BACKGROUND OF THE INVENTION

1. Field of the Invention

The present invention relates generally to physiological biometrics, including automated fingerprint identification systems (AFISs), and in particular to a system and method for mobile scanning and reporting of fingerprint scans and receiving identification data.

2. Description of the Related Art

Physiological biometric data is used in forensic science to identify suspects, victims and other persons. For example, fingerprints collected from a crime scene, or from items of evidence from a crime, can be used to determine who touched the surface in question. Fingerprints are the primary source of physiological biometric data used for identification purposes today. Fingerprint identification emerged as an important system within various law enforcement agencies in the late 19th century. This system replaced anthropometric measurements as a more reliable method for identifying persons having a prior record, often under an alias name, in a criminal record repository. The science of fingerprint identification stands out among all other forensic sciences for many reasons, including its superiority and reliability.

Fingerprint identifications lead to far more positive identifications of persons worldwide than any other identification procedure. The U.S. government alone effects positive identification of over 70,000 persons daily. A large percentage of the identifications, including approximately 92% of the U.S. Visit Program identifications, are affected in a computer identification process with high accuracy based on only two fingerprints from each individual.

Fingerprint identification is the process of comparing questioned and known friction skin ridge impressions (e.g. minutiae) from fingers or palms or even toes to determine if the impressions are from the same finger or palm. The flexibility of friction ridge skin means that no two finger or palm prints are ever exactly alike (never identical in every detail); even two impressions recorded immediately after each other. Fingerprint identification occurs when an expert or computer system determines that two friction ridge impressions originated from the same finger, palm, toe, etc., to the exclusion of all others.

A known print is the intentional recording of the friction ridges, usually with black printer's ink rolled across a contrasting white background, typically a white card. Friction ridges can also be recorded digitally using a technique called live scan. A latent print is the chance reproduction of the friction ridges deposited on the surface of an item. Latent prints are often fragmentary and may require chemical methods, powder, or alternative light sources in order to be visualized.

When friction ridges come in contact with a surface that is receptive to a print, material on the ridges, such as perspiration, oil, grease, ink, etc. can be transferred to the item. The factors which affect friction ridge impressions are numerous, thereby requiring examiners to undergo extensive and objective study in order to be trained to competency. Pliability of the skin, deposition pressure, slippage, the matrix, the surface, and the development medium are just some of the various factors which can cause a latent print to appear differently from the known recording of the same friction ridges. Indeed, the conditions of friction ridge deposition are unique and never duplicated. This is another reason why extensive and objective study is necessary to achieve competency in fingerprint identifications.

There exist systems known as automatic fingerprint identification systems (AFISs) for accomplishing automatic authentication or identification of a person using his/her fingerprint. Search programs such as the Tracker product line by AFIX Technologies Inc. of Pittsburgh, Kans., the assignee of this application, can be used to take a fingerprint image and conduct a search from a major database. A fingerprint of a person comprises a distinctive and unique ridge pattern structure. For authentication or identification purposes, this ridge pattern structure can be characterized by endings and bifurcations of the individual ridges. These features are popularly known as minutiae. These automatic authentication systems include the U.S. Department of Defense (DoD) Automatic Biometric Identification System (ABIS), which is able to search all ten finger positions, and the Federal Bureau of Investigation (FBI) Integrated Automated Fingerprint Identification System (IAFIS). In order for a forensic fingerprint scanning system to be able to submit latent submissions to either the ABIS or the IAFIS, certain qualifications must be met.

The methods of U.S. Pat. No. 5,420,937, the system and methods of U.S. patent application Ser. No. 13/412,512, and the system and methods of U.S. patent application Ser. No. 13/095,601, which are assigned to a common assignee and are incorporated herein by reference, provide relevant background regarding AFIS systems and methods commonly used to search major fingerprint database records to find results, and also provide a unique and useful approach to performing such a search within a fingerprint database using state-of-the-art techniques.

Existing AFIS systems typically require a stationary location where fingerprints are taken and individuals can be identified. This requires a police officer or other individual to either take ink or digital fingerprints of an individual at a remote location and transport those prints back to a computer where the prints can be processed, or to take the individual to the police station or other location where printing is actually performed.

What is a desired is a mobile application capable of taking fingerprint information of an individual, as well as other optional identification data, and uploading that information directly to the AFIS system of choice. Such a mobile application would allow a user to nearly instantly determine whether an individual has any outstanding warrants or other issues of concern, based solely upon fingerprints taken at a remote location. Such a system could also be used for identification of injured or unknown individuals during a crisis situation.

Heretofore there has not been available a mobile identification system or method with the advantages and features of the present invention.

SUMMARY OF THE INVENTION

In the practice of an aspect of the present invention, a mobile application stored on a mobile device, such as a mobile phone, is used in conjunction with a fingerprinting device. Fingerprints are taken with the fingerprinting device and transferred to the mobile device for processing and storage. The mobile device communicates with the fingerprinting device via Bluetooth communication or through some similar means.

Once fingerprint files are transferred from the fingerprinting device to the mobile phone, additional information may be added to the fingerprints. The user may enter identifying information associated with the fingerprints such as the name of the person whose prints have been taken. Additionally, the user may use a camera on the mobile device to capture a photograph of the person whose prints have been taken, and that photograph may be associated with the fingerprint file. The user will then upload the fingerprint file to a remote message store (RMS) for long term storage and processing. No identification data is permanently stored on the mobile device.

The mobile device may also access the RMS or other AFIS services where fingerprint files are saved, along with other identifying information and data related to the individual whose fingerprints are sought. As an example, the user may take fingerprints of an unknown individual and match them with identifying information located in the RMS or remote AFIS service. The user can view the identifying information on the mobile device, as well as determine other relevant information about the previously unidentified person, such as whether that individual has any outstanding warrants.

A mobile application stored within the mobile device allows for file collection, transfer, and display on a smart device with G3, G4, EDGE, or similar data communication capabilities. The software is used in conjunction with information collection devices synced to a smart device via Bluetooth technology, such as a fingerprinting device. The device will transfer a file to the smart device running the mobile application. The application will then encrypt the file using 256 Rijndael, base64, and encode the file that is then packaged into a proprietary format. The file is then sent to a web location using the data transmission capability of the mobile device. The device will then monitor a file location of a web address for a return response. It will then get the file from the web location in a standard NIST approved format, and extract information and images from the file, displaying them in a GUI.

BRIEF DESCRIPTION OF THE DRAWINGS

The drawings constitute a part of this specification and include exemplary embodiments of the present invention and illustrate various objects and features thereof.

DETAILED DESCRIPTION OF THE PREFERRED EMBODIMENTS

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. Said terminology will include the words specifically mentioned, derivatives thereof and words of similar meaning.

The following is a list of common acronyms that may be used herein:

| ACRONYM/ABBREVIATION | DEFINITION/DESCRIPTION |
|---|---|
| GUI | Graphical User Interface |
| MSIL | Microsoft Intermediate Language |
| OS | Operating System |
| PDA | Personal Digital Assistant |
| SD | Smart Device (e.g. cell phone or PDA) |
| XML | Extensible Mark-up Language |
| RMS | Remote Message Store |
| ANSI | American National Standards Institute |
| NIST | National Institute of Standards and Technology |

The presented mobile identification application is based on a concentrated architecture where a fingerprint collection device is paired with a smart device via Bluetooth for display of information. The collection device will be used to collect biographical information (fingerprints), package them in standardized format put forth by ANSI/NIST and sent to a synchronized Bluetooth device (cellular phone or PDA). The smart device will then allow entry of customized information and the ability to discard the information previously sent. Once information meets the review requirements of the collector, it can be sent to a Remote Message Store for searching against a database of fingerprint records. The searching system polls the RMS and gathers any searches submitted to the system. Once the host system completes its search it will return an .eft file to the RMS. The smart device will poll the RMS for these return results. If a proper return result is present, it gathers it from the RMS, parses the information from a light weight .eft file and displays it in the GUI. A fundamental precept of this architecture is that all components react quickly and reliably. The goal of this structure is to gather information from a field location to query against a known database location for the person in question and return the known information to the collector on site.

II. Preferred Embodiment or Aspect of a Mobile Identification System 2

Figure 1:
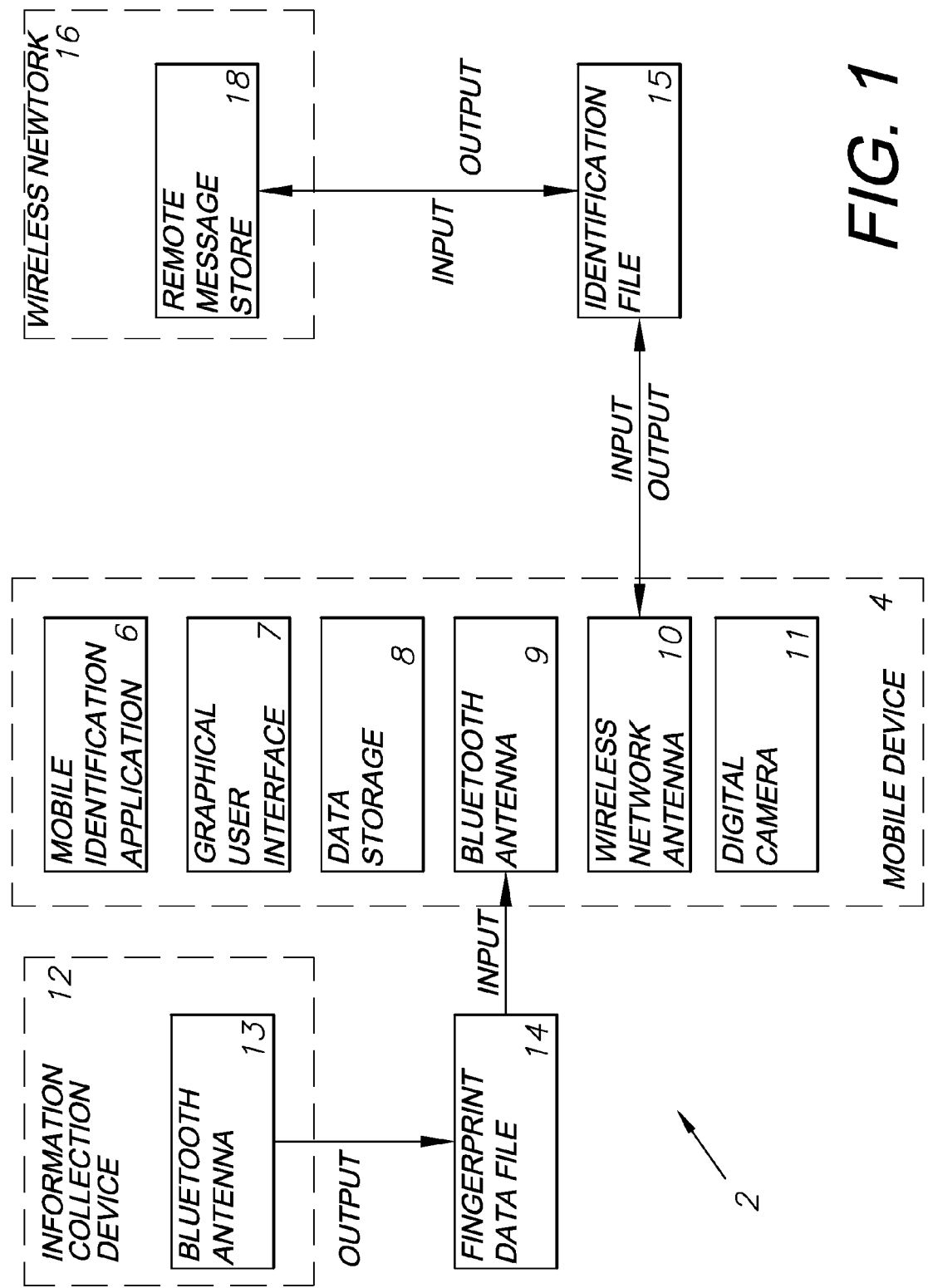
FIG. 1 is a block diagram of mobile identification system embodying an aspect of the present invention.

A preferred embodiment of the present invention is shown in FIG. 1. The mobile identification system 2 includes three main components: a mobile device 4, an information collection device 12, and a wireless information network 16.

The mobile device 4 would typically be a mobile telephone, PDA, or other smart device which includes a processor capable of handling data. The mobile device 4 has a mobile identification application 6 stored within the device's data storage 8 memory. The device also includes a GUI 7 for interacting with the application 6. The mobile device 4 further includes a Bluetooth antenna 9, a wireless network antenna 10, or some other means of communicating with other devices and digital information. The device 4 may also have a digital camera 11 built into it for taking digital photographs of persons of interest.

An information collection device 12, such as a fingerprinting device, accompanies the mobile device 4. The two could be integrated into one piece of equipment (e.g. a mobile device 4 with a built-in information collection device 12 or application for performing the same). In an embodiment where the mobile device 4 and the information collection device 12 are separate, the information collection device must have a Bluetooth antenna 13 or other means of communicating with the mobile device wirelessly or digitally.

The information collection device 12 outputs a fingerprint data file 14 which is received by the mobile device 4. The mobile device encrypts the data file. Additional information may be entered into the mobile device, such as descriptive features of the person whose fingerprints have been taken by the information collection device. These details may include the person's name, age, sex, or other vital details. The information can also identify the finger(s) associated with the information and the type of print taken. The computing device generates a random globally unique identifier (GUID) and associates the GUID with a fingerprint image. If a digital photograph of the individual was taken, that photograph can also accompany the encrypted fingerprint data file 14.

A graphic user interface (GUI) includes a drag and drop layout board comprised of an empty space where a number of customizable image boxes can be created, placed, moved, resized and locked. The system 2 has a default output display configuration where fourteen boxes are available, each box containing a different fingerprint, such as each individual finger, slapped portions of hands or thumb prints. This default setup is designed to meet major forensic database search requirements in conjunction with the form, having appropriate personal information boxes located elsewhere within the window. If a different image layout is required other than the default layout, the user can simply choose to use a customized setup. In a customized setup, the user will individually adjust the size and placement of each individual image box within the layout board, and upload whatever fingerprint image is desired into each box. A layout of customized image boxes can be saved as a template for future use. The plurality of customizable image boxes are automatically produced in a layout which conforms to meet the requirements of a predefined searchable forensic database containing identified fingerprints. The fingerprint images are automatically placed into the image boxes based upon a fingerprint image GUID number or other fingerprint identification characteristics.

Finally, there are numerous option buttons located on the screen display that allow for user input by mouse-controlled interface. Several options are available to the user, such as saving the present customized box layout for future use, resetting the box positions to default, accepting the record in the array in order to export a file type, skipping a particular image search, or aborting the entire search or scan. These options allow easy, one-click interface between the user and the software program.

The mobile device 4 outputs an encrypted "identification file" 15 which is uploaded over a wireless network 16 to a remote message store (RMS) 18. No data is saved to the mobile device 4, and all identifying information is purged from the device once the data is uploaded to the RMS 18.

Alternatively, the mobile device may access information from the RMS 18 or other databases. The mobile identification application 6 can match a fingerprint data file 14 with known information matching the fingerprints stored in the RMS or other database. Identifying information about the person whose fingerprints are uploaded may be viewed on the mobile device 4, along with other critical information about the person of interest. This includes outstanding warrants or medical information that may be on file.

III. Sending an Identification File

The purpose of the present invention is to record an individual's fingerprints and incorporate other identifying information along with those fingerprints. All of this information is then stored on an RMS. The mobile application 6 includes a Send/Receive Manger which is responsible for the routing of the transferred files. It will receive the files from the information collection device 12 via Bluetooth technology or similar wireless communication technology. Once it is received, the user will be able to review the quality of the prints captured by the collection device, enter a short description of the search, capture a photo to be associated, and either send the results to the searching system or discard the prints and collect new prints with the collection device. Once the user decides to send the search transaction, the mobile device will then package the file correctly and send it to the RMS located at a specific web address.

Figure 2:
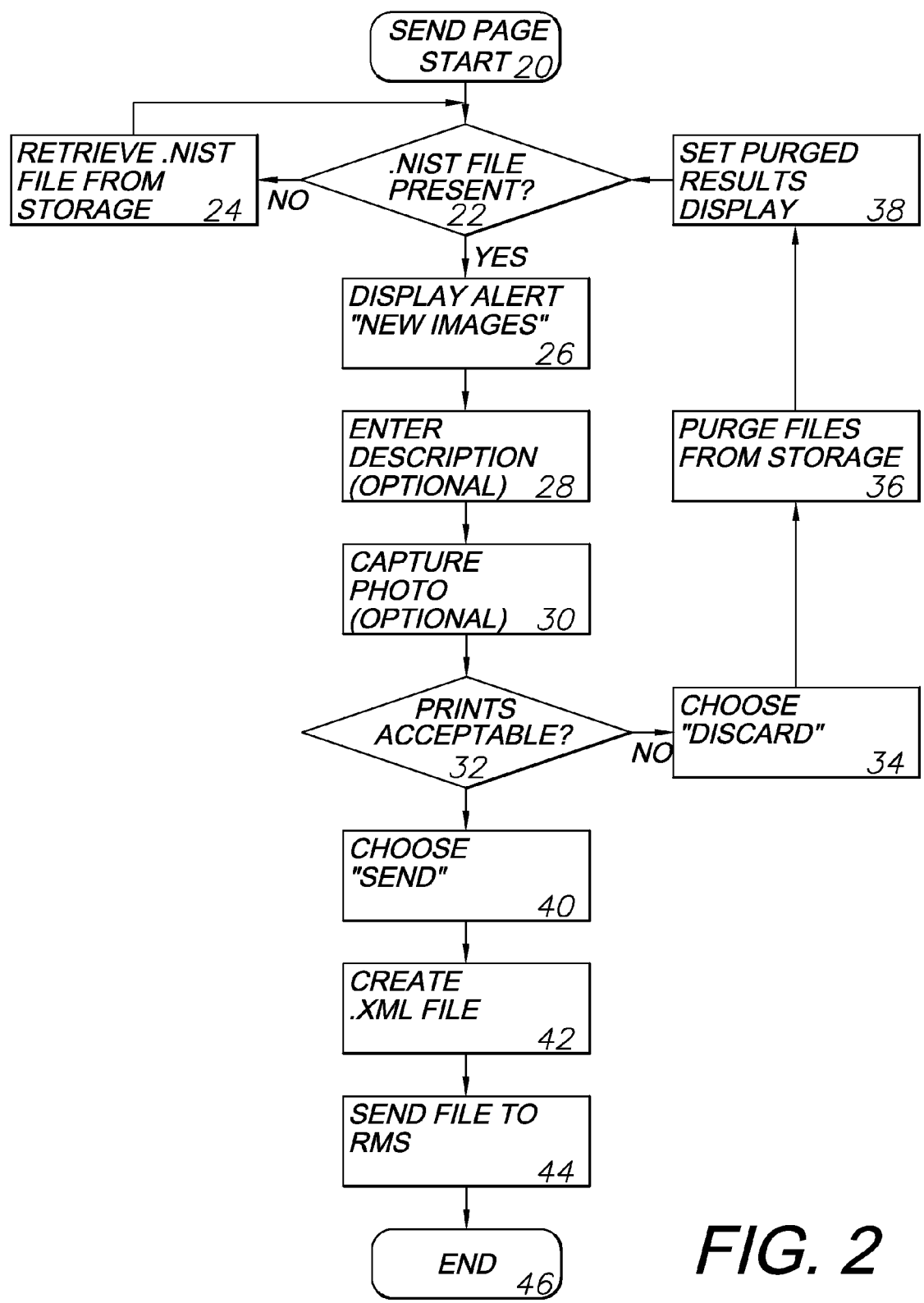
FIG. 2 is a flowchart for a process of acquiring and sending fingerprint and identification data to a remote message store (RMS).

FIG. 2 demonstrates a method of sending the identification data from the mobile device 4 to the RMS 18. The process starts at 20 by selecting the "SEND" page on the mobile application 6. The mobile application then determines whether a .NIST file containing fingerprint data is present at 22. If no file is present, the mobile device can retrieve a .NIST file from memory storage or from the information collection device 12. This step occurs at 24, after which the application again checks to ensure a .NIST file is present at 22.

Once a fingerprint file is present, the mobile application 6 will alert the user via the GUI 7 that a "new image" is available at 26. The phrase "new image" or similar language will be prominently displayed on the GUI 7.

Using the GUI 7, the user may optionally enter a description for the .NIST file at 28. This description may include descriptive information about the person whose fingerprints have been taken, such as name, date of birth, sex, etc.

Using the digital camera 11, the user may optionally take a photograph of the fingerprinted individual and attach that photograph to the .NIST file at 30. This photograph will ultimately be tied to the identification file 15 uploaded to the RMS 18.

The user inspects the fingerprints uploaded to the phone and determines whether the quality of the prints is adequate at 32. If the prints are not adequate, the user will choose the "discard" option at 34. A button located on the GUI will allow the user to discard the chosen .NIST file. Next, all data associated with the previous .NIST file are purged from the mobile device's storage memory at 36. The GUI then informs the user via display that the results have been purged at 38.

If the quality of prints is acceptable, the user will choose the "send" option located on the GUI at 40. The mobile device encodes the outgoing data file to a .XML file at 42 and sends the file to the RMS at 44. The process ends at 46.

A results review page is also part of the mobile application 6. This page will maintain the status of all sent and received transactions. The search can be seen on the review page as long as the file has not been purged from the SD. Two pieces of optional information can be displayed here; a capture photo and/or a description. Both are entered on the review page prior to sending. If a photo is not present, a default silhouette will appear in its place. If no description is entered at review then a default value of "No Description Entered" will appear in its place.

IV. Retrieving an Identification File

The mobile device 4 may also retrieve identification files and details about individuals from the RMS 18 or other databases. The results viewer portion of the mobile application 6 is responsible for displaying the received file from a search. The application will poll a web location for a returned result and display it on the mobile device. The returned result will be a standard format electronic fingerprint transmission meeting ANSI/NIST standards. The display will consist of two sections. The first will be a simple display showing a photo of the returned result, the subject's name, and an indicator of any warrants entered. A simple "swipe" across the screen of the mobile device 4 instructs the mobile application 6 to show a second page that displays two of the submitted prints, the subject's name, and demographics such as sex, race, height, weight, hair color, and eye color. In addition, this page will display whether the individual has any outstanding warrants or other critical details.

Figure 3:
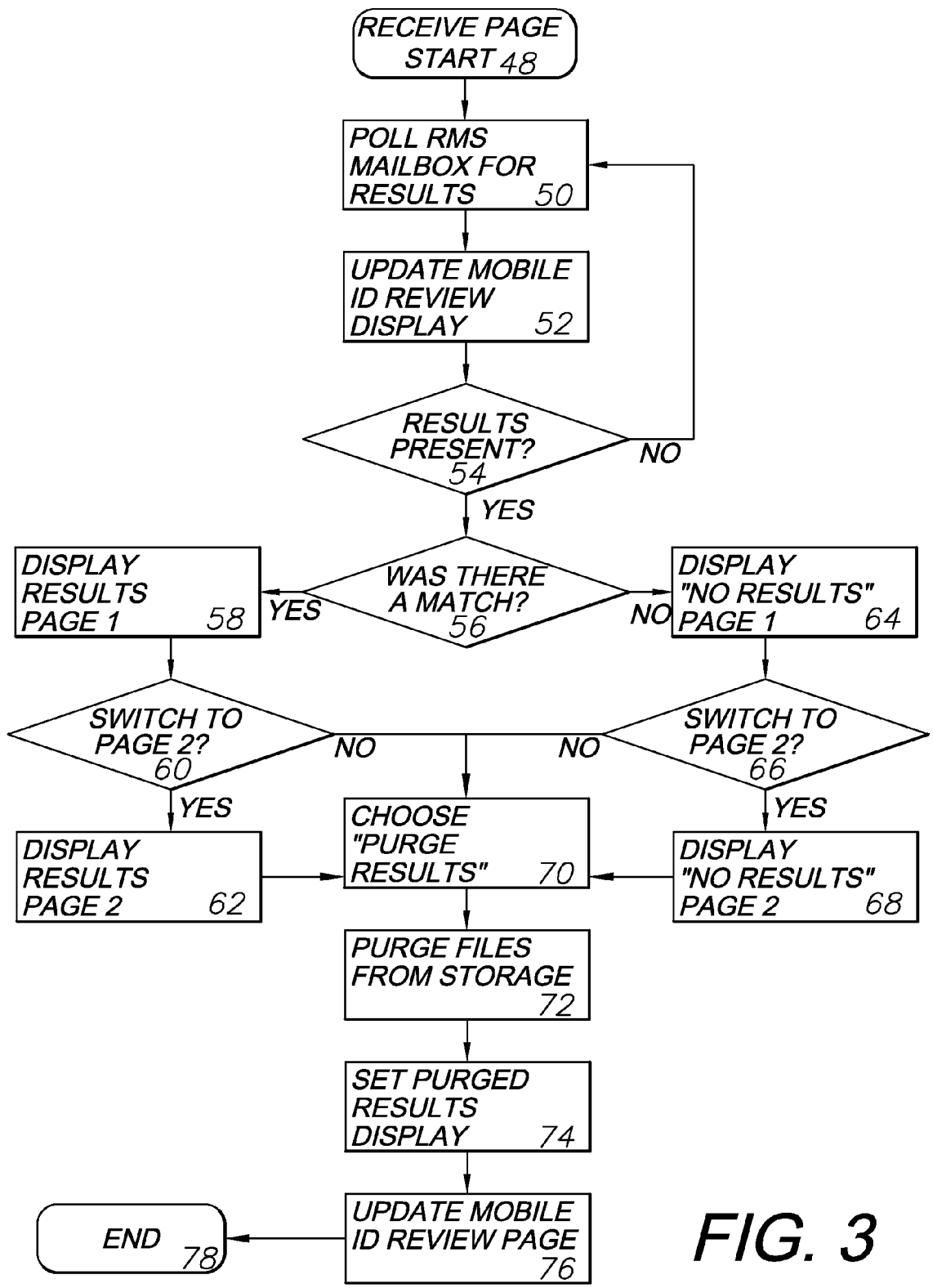
FIG. 3 is a flowchart for a process of accessing fingerprint and identification data from an RMS or other source.

FIG. 3 demonstrates a method of retrieving identification data from RMS 18 or another accessible database. The process starts at 48 where the user accesses the "receive information" page function on the mobile application 6.

The mobile application will poll the RMS mailbox for the search results at 50. The GUI display will update on the mobile device every several seconds at 52. At 54, the application determines whether the results have been found. If a "no" response is received, the polling continues at 50.

Once results are present at 54, the mobile application then determines whether there was a match at 56. Here, the mobile application has sent out fingerprint data, and optionally has provided descriptive information about the individual. The RMS has been polled, and results may have been returned.

If the mobile application 6 receives a matching result at 56, it displays the first of two "results" pages at 58. As described above, this first results page displays a photo of the returned result, the subject's name, and an indicator of any warrants entered.

The user may choose to switch to the second results page at 60. If the user selects to do this, the second results page is displayed at 62. This second results page displays two of the submitted finger prints, the subject's name, and demographics such as sex, race, height, weight, hair color, and eye color. In addition, this page will display whether the individual has any outstanding warrants or other critical details.

If the mobile application 6 doesn't receive a matching result at 56, it similarly returns two "results" pages. However, each of these pages display "no results." The first page appears at 64. If the user opts to view the second page at 66, the second page is displayed at 68. Each page will show the default "no results," unless some piece of information is available.

Once the results have been viewed, the user must choose to "purge results" at 70. This ensures that detailed identification information is not stored on the mobile device, which protects the fingerprinted individual's privacy. The files are purged at 72, and the GUI provides a display alerting the user that the results have been purged at 74. The mobile identification review page is updated at 76 with any information the user may have added, and the process ends at 78.

V. Additional Features

A preferred embodiment of the present invention should be useable by a number of different mobile devices, including mobile phones using different operating systems. The system 2 must handle ANSI/NIST .eft files, including the extraction of embedded data from fingerprint files, as mentioned above.

The mobile application 6 graphical user interface 7 should be simple enough for a user with limited technical knowledge. Basic information is presented prominently between a first and second "results" screen that the user may "flip" between.

No data or identifying information should be stored on the mobile device. All identifying data will be purged after each use. The user may re-access data stored on the RMS at any time.

The following is merely an example of a file which may be sent to the RMS to initiate a search for the identification of a person:

```
<message>
    <data>
        zDad26irHJJAnDcy8RDHrj127xGFOBgQoVXkv2VZ+22nHAjnhS3S7piJF9MRocK
        IKSsnDv4w+Nw5T05FFumTRJu/fGZ2XcWUU1UsJesUpgkzmUpwmIYU6SFuGi
        MniZ0207w6glcHQzK98kNaxKmbF99MaENjYugoKXnrTBuwYkP75n44Kqpnl8B
        LJDw9XDXsfWVeswjrwiALaeCvEddG6gbVY1Xs43ERE8WHbnehxlMdGKhTB9
        MrVCSZLOly1
        ZYsUdXzDx5QlWdZFyaDgrESOemNxzTZFOW9avTjNsSIBsjgwg2
        vepl+12KTFM9V9Glv9LBcNqSaMfaa4adBEy39jxHUAJI6jPe80+sgScRr+uAl97Sc
        9/ZogNfYWNc2LOIXH638F2dkoUMlwkagTOv+uB+VBdnZKFDJcJGoEzr/rgfrfwX
        Z2ShQyXCRqBM6/64FuQ4Fq5xVKWbD610RiEh+WROQlc577AUmXPkBDdNc1
        8012vUVemi rz1 qc1/8N9HXsP3yFgz90CcdEwNzmNAHCA==
    </data>
    <metadata>
        <filename>
            RE_THEAGENCY_MTPIS_{7EOOD653-8156-4892-97EE5EC5E8DCBE75}.
            eft
        </filename>
        <callback>
            http://remotesearch.afixservices.com/AfixRemoteSearchServiceIRemoteSearchService.asmx
        </callback>
        <DstAgency>THEAGENCY</DstAgency>
        <SrcAgency>MOBILE001 </SrcAgency>
    </metadata>
</message>
```

It is to be understood that while certain aspects of the disclosed subject matter have been shown and described, the disclosed subject matter is not limited thereto and encompasses various other embodiments and aspects. The above-mentioned steps and components are not meant to limit the use or organization of the present invention. The steps for performing the method may be performed in any logical method and the process can be used for other types of image-matching processes when viable.

Having thus described the disclosed subject matter, what is claimed as new and desired to be secured by Letters Patent is:

1. A mobile, automatic fingerprint identification system comprising:

a mobile image input device capable of transmitting a scanned fingerprint image;

a mobile computing device including a memory storage device, a graphical user interface (GUI), and a processor, said image input device adapted for delivering a fingerprint image to said computer, wherein said image is saved to said memory storage device;

said mobile computing device receiving identification data input into said mobile computing device with said user input interface and associating said identification data with said fingerprint image, said identification data including the identity of the person to whom the fingerprint belongs, the finger from which the print was taken, and the type of print taken;

said mobile computing device capable of generating a random globally unique identifier (GUID) number and associating that number with said fingerprint image;

image editing software stored on said memory storage device, said software capable of clarifying said fingerprint image, including increasing contrast and reducing image blur;

said image editing software including an image layout board stored within said computer memory storage device;

said image software capable of producing a plurality of customizable image boxes which can be moved, resized, locked, and unlocked within said image layout board;

wherein a fingerprint or handprint image is stored within each of said customizable image boxes;

said plurality of customizable image boxes being adapted to be placed into a desired layout and saved as a template for future use;

said plurality of customizable image boxes are automatically produced in a layout which conforms to meet the requirements of a predefined searchable forensic database containing identified fingerprints;

fingerprint images being automatically placed into said image boxes based upon said fingerprint image GUID number or other fingerprint identification characteristics;

said mobile computing device capable of locating identifying minutiae from said scanned fingerprint image and comparing said identifying minutiae against a database containing a plurality of identified fingerprints; and said mobile computing device further capable of identifying the person to whom the fingerprint belongs.

2. The system according to claim 1, further comprising:

said mobile device further including a digital camera, wherein said camera is capable of taking a photograph of an individual whose fingerprints have been taken with said information collection device, and temporarily storing the photograph data within said mobile device storage memory;

associating said photograph with said fingerprint data file; and said mobile device processor capable of encoding said fingerprint image data file with said photograph data, such that said photograph is stored within said fingerprint data file.

3. The system according to claim 1, further comprising:

said mobile device GUI capable of receiving text data; and said mobile device processor capable of encoding said fingerprint image data file with said text data.

4. The system according to claim 1, wherein said fingerprint data file created by said information collection device is a .NIST data file format.

5. The system according to claim 1, wherein said mobile device is capable of encoding said fingerprint data file into an .XML data file format.

6. A method of identifying a fingerprint comprising the steps:

providing a mobile computing device including a memory storage device, a graphical user interface (GUI), and a processor, said image input device adapted for delivering a fingerprint image to said computer, wherein said image is saved to said memory storage device;

acquiring an image of a fingerprint on said mobile computing device;

inputting identification data into said mobile computing device with said user input interface and associating said identification data with said fingerprint image, said identification data including the identity of the person to whom the fingerprint belongs, the finger from which the print was taken, and the type of print taken;

generating a random globally unique identifier (GUID) number and associating that number with said fingerprint image;

clarifying the fingerprint image using image editing software on said mobile computing device;

said image editing software including an image layout board stored within said computer memory storage device;

said image software capable of producing a plurality of customizable image boxes which can be moved, resized, locked, and unlocked within said image layout board;

wherein a fingerprint or handprint image is stored within each of said customizable image boxes;

said plurality of customizable image boxes being adapted to be placed into a desired layout and saved as a template for future use;

said plurality of customizable image boxes are automatically produced in a layout which conforms to meet the requirements of a predefined searchable forensic database containing identified fingerprints;

fingerprint images being automatically placed into said image boxes based upon said fingerprint image GUID number or other fingerprint identification characteristics;

said mobile computing device capable of locating identifying minutiae from said scanned fingerprint image and comparing said identifying minutiae against a database containing a plurality of identified fingerprints;

said mobile computing device further capable of identifying the person to whom the fingerprint belongs;

locating with said mobile computing device identifying minutiae on said fingerprint image, including ridge bifurcations and end points; and identifying with said mobile computing device the person to whom the fingerprint belongs based upon said fingerprint minutiae.

7. The method according to claim 6, wherein said mobile device further includes a digital camera, the method further comprising the steps:

capturing a photograph of said individual using said mobile device digital camera;

saving said photograph as a photograph data file;

associating said photograph data file with said fingerprint data file; and wherein said encoded identification data file includes said photograph data file information and said fingerprint data file information.

8. The method according to claim 6, further comprising the steps:
   entering text data into said mobile device using said GUI;
   saving said text data as a text data file;
   associating said text data file with said fingerprint data file; and
   wherein said encoded identification data file includes said text data file information and said fingerprint data file information.

9. The method according to claim 6, further comprising the step:
   searching said searchable database with the data of said encoded identification file;
   locating data files associated with said individual, wherein said data files include identifying information;
   transmitting said identifying information to said mobile device; and
   displaying said identifying information on said mobile device GUI.

10. A method of identifying a fingerprint comprising the steps:
    providing a mobile computing device including memory storage, GUI, and user input interface;
    acquiring an image of a fingerprint;
    storing said fingerprint image in said memory storage;
    inputting identification data into said mobile computing device with said user input interface and associating said identification data with said fingerprint image, said identification data including the identity of the person to whom the fingerprint belongs, the finger from which the print was taken, and the type of print taken;
    generating a random globally unique identifier (GUID) number and associating that number with said fingerprint image;
    providing image editing software including an image layout board and storing said image editing software onto said mobile computing device memory storage;
    clarifying the fingerprint image using said image editing software;
    producing a plurality of customizable image boxes using said image software, wherein said image boxes may be moved, resized, locked, and unlocked within said image layout board, and arranging said customizable image boxes to conform with requirements of a predefined searchable forensic database containing identified fingerprints;
    automatically placing fingerprint images into said image boxes based upon said fingerprint image GUID number or other fingerprint identification characteristics;
    saving said image box layout into a single request file, and submitting said request file to said forensic database;
    locating identifying minutiae on said fingerprint image, including ridge bifurcations and end points; and
    identifying the person to whom the fingerprint belongs based upon said fingerprint minutiae.

* * * * *